US010225690B2

United States Patent
Grotendorst et al.

(10) Patent No.: US 10,225,690 B2
(45) Date of Patent: Mar. 5, 2019

(54) CAR2X RECEIVER FILTERING BASED ON A RECEIVING CORRIDOR IN A GEOGRAPHIC COORDINATE SYSTEM

(71) Applicant: Continental Teves AG & Co. oHG, Frankfurt (DE)

(72) Inventors: Thomas Grotendorst, Eschborn (DE); Marc Menzel, Weimar (DE); Richard Scherping, Liederbach am Taunus (DE); Ulrich Stählin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/912,439

(22) PCT Filed: Aug. 22, 2014

(86) PCT No.: PCT/EP2014/067939
§ 371 (c)(1),
(2) Date: Feb. 17, 2016

(87) PCT Pub. No.: WO2015/025047
PCT Pub. Date: Feb. 26, 2015

(65) Prior Publication Data
US 2016/0198303 A1 Jul. 7, 2016

(30) Foreign Application Priority Data
Aug. 22, 2013 (DE) .................. 10 2013 216 626

(51) Int. Cl.
*H04W 4/02* (2018.01)
*G08G 1/09* (2006.01)
(Continued)

(52) U.S. Cl.
CPC ............ *H04W 4/023* (2013.01); *G08G 1/093* (2013.01); *G08G 1/09675* (2013.01);
(Continued)

(58) Field of Classification Search
None
See application file for complete search history.

(56) References Cited

U.S. PATENT DOCUMENTS

| 9,014,921 | B2 | 4/2015 | Bretzigheimer |
| 2002/0087408 | A1* | 7/2002 | Burnett .................. G06Q 30/02 |

(Continued)

FOREIGN PATENT DOCUMENTS

| DE | 102004030994 | 1/2006 |
| DE | 102011080789 | 2/2012 |

(Continued)

OTHER PUBLICATIONS

German Search Report for German Application No. 10 2014 216 779.5 dated Mar. 24, 2015, including partial translation.
(Continued)

*Primary Examiner* — Mohammad S Adhami
(74) *Attorney, Agent, or Firm* — RatnerPrestia

(57) ABSTRACT

A method for filtering a message transmitted between a transmitter and a receiver in a vehicular ad hoc network, the message containing at least one position of the transmitter, including: determining a position of the receiver by a global satellite navigation system in a predetermined coordinate system; determining a decision threshold for a maximum distance between the receiver and the transmitter in the predetermined coordinate system in which the position of the receiver was determined; and discarding the message if a distance between the position of the transmitter and the position of the receiver exceeds the decision threshold.

11 Claims, 5 Drawing Sheets

(51) Int. Cl.
 *G08G 1/0967* (2006.01)
 *G08G 1/16* (2006.01)
 *H04W 4/04* (2009.01)
 *H04W 84/18* (2009.01)

(52) U.S. Cl.
 CPC ....... *G08G 1/096791* (2013.01); *G08G 1/162* (2013.01); *G08G 1/163* (2013.01); *H04W 4/027* (2013.01); *H04W 4/046* (2013.01); *H04W 84/18* (2013.01)

(56) References Cited

U.S. PATENT DOCUMENTS

| | | | |
|---|---|---|---|
| 2007/0005609 A1* | 1/2007 | Breed | B60N 2/2863 |
| 2010/0194633 A1* | 8/2010 | Yamagata | G01S 19/42 |
| | | | 342/357.33 |
| 2010/0256852 A1* | 10/2010 | Mudalige | G08G 1/163 |
| | | | 701/24 |
| 2011/0140968 A1 | 6/2011 | Bai | |
| 2012/0220231 A1 | 8/2012 | Stahlin | |
| 2013/0099941 A1* | 4/2013 | Jana | H04W 4/023 |
| | | | 340/905 |
| 2013/0151412 A1* | 6/2013 | Spahl | G06Q 20/40 |
| | | | 705/44 |
| 2014/0020098 A1 | 1/2014 | Stahlin | |
| 2014/0143834 A1 | 5/2014 | Stahlin | |
| 2015/0138975 A1 | 5/2015 | Gotz | |

FOREIGN PATENT DOCUMENTS

| | | |
|---|---|---|
| DE | 102010054080 | 6/2012 |
| DE | 102012204880 | 10/2012 |
| DE | 102011078704 | 1/2013 |
| EP | 1788749 | 5/2007 |
| WO | 2010139526 | 12/2010 |
| WO | 2013185997 | 12/2013 |

OTHER PUBLICATIONS

International Search Report for International Application No. PCT/EP2014/067939 dated Jan. 8, 2015.

Lin, J.R., et al., "Feasibility of safety applications based on intra-car wireless sensor networks: A case study," Sep. 5, 2011, pp. 1-5, Vehicular Technology Conference (VTC Fall), 2011 IEEE.

* cited by examiner

CAR2X RECEIVER FILTERING BASED ON A RECEIVING CORRIDOR IN A GEOGRAPHIC COORDINATE SYSTEM

CROSS REFERENCE TO RELATED APPLICATIONS

This application is the US National Phase Application of PCT International Application No. PCT/EP2014/067939, filed Aug. 22, 2014, which claims the priority to German Patent Application No. 10 2013 216 626.5, filed Aug. 22, 2013, the contents of such applications being incorporated by reference herein.

FIELD OF THE INVENTION

The invention relates to a method for filtering a message transmitted between a sender and a receiver in a vehicle ad hoc network, to a filter apparatus for performing the method and to a receiver having the filter apparatus.

BACKGROUND OF THE INVENTION

WO 2010/139 526 AI, which is incorporated by reference discloses a mobile ad hoc network called car2X whose nodes are particular road users, such as vehicles, or other objects in road traffic, such as traffic lights. These networks can be used to provide the road users involved in the car2X network with advice of road traffic states, such as accidents, congestion, hazard situations, etc.

SUMMARY OF THE INVENTION

An aspect of the invitation aims to improve the use of such mobile ad hoc networks.

According to one aspect of the invention, a method for filtering a message, transmitted between a sender and a receiver in a vehicle ad hoc network, that describes at least one position of the sender comprises the steps of:
- determination of a position of the receiver by means of a global satellite navigation system in a predetermined coordinate system,
- determination of a decision threshold for a maximum distance between the receiver and the sender in the predetermined coordinate system in which the position of the receiver has been determined, and
- rejection of the message if a distance between the position of the sender and the position of the receiver exceeds the decision threshold.

The specified method is based on the consideration that useful data describing messages are interchanged between sender and receiver in a vehicle ad hoc network usually in what are known as data packets. When the sender sends useful data, it packs them into a data packet and sends it to the receiver, which then has to unpack the useful data from the data packet for the purpose of further processing. This requires a particular degree of computation power. Since different volumes of messages and hence useful data are interchanged depending on the traffic situation, the computation power that needs to be kept available for further processing of the relevant data packets is also dependent on the traffic situation. The computation power that needs to be kept available could be harmonised, however, if some of the data packets received in the receiver are filtered out as irrelevant, for example in advance, so that the receiver no longer needs to inspect the relevant message in the first place.

However, such filtering operations require the provision of decision bases in order to classify the received data packets as relevant or irrelevant. One such decision basis that could be used is a decision threshold for the physical distance between the sender and the receiver of a data packet, for example, the sender in this case being intended to be understood not as a physical sender of the data packet but rather as an originator of the data packet that has produced the useful data in the data packet. The physical sender of the data packet may also be an intermediate entity that has received the data packet from the originator, for example, and hence from the actual sender and has forwarded it to the receiver. If, by way of example, a vehicle, as receiver, is too far away from a sender, such as another vehicle, a set of traffic lights and so on, then the sender can be eliminated as irrelevant solely on the basis of its excessive physical distance from the receiver.

The distance between sender and receiver first of all takes into account the absolute position of the receiver, which can be determined without any problem using the global satellite navigation system. The absolute position of the sender is transmitted via the vehicle ad hoc network, so that the distance between sender and receiver is fundamentally determinable. However, the decision threshold for filtering a data packet and hence a message on the basis of the physical distance between sender and receiver is determined in a coordinate system that is defined by a specification for the vehicle ad hoc network, since on the basis of this coordinate system, the aforementioned useful data of the data packet are also processed further when the data packet is not filtered out. For technical reasons, this coordinate system is the Cartesian coordinate system.

For the purpose of filtering a received data packet and hence a message on the basis of the distance between sender and receiver, the aforementioned position of the receiver, as determined using the global navigation satellite system, must therefore first of all be converted to the coordinate system defined by the specification for the vehicle ad hoc network before the decision threshold determined in this coordinate system can be taken as a basis for making the decision to filter out the received data packet. Since, as a rule, particularly in high-load situations, most data packets are filtered out anyway and therefore not used further, an unnecessarily high level of computation complexity can arise at this juncture, however.

In order to reduce this computation complexity and to achieve the aforementioned harmonisation of the computation load in times of high load, it is proposed, for the purposes of the specified method, that the decision threshold be determined no longer in the coordinate system that is defined by the standard for the vehicle ad hoc network but rather in the coordinate system that is prescribed by the global satellite navigation system. In this way, reception of a data packet can immediately be followed by a decision regarding whether or not said data packet is filtered out, and the filtering process can be performed as early as possible in the reception chain.

In one development of the specified method, the predetermined coordinate system is a spherical coordinate system that describes positions in geocoordinates on the earth's surface. Such a coordinate system is also called an ellipsoid coordinate system and, depending on the system, has worldwide validity. Therefore, it does not first need to be adapted to suit a local standard.

In a special development of the specified method, the decision threshold comprises a corridor around the position of the receiver, so that the message is rejected if the position of the sender is outside the corridor. In this case, the corridor defines a region around the receiver. The region moves with the receiver, in principle. In this case, the receiver may be a vehicle and the corridor may be larger in the direction of travel of the vehicle than counter to the direction of travel. In this way, the corridor can be kept constant over a predetermined period and does not have to be recalculated on every change of location of the vehicle, which likewise results in a perceptible decrease in the computation power necessary for performing the specified method. Alternatively, it is conceivable for the updating of the corridor to be performed on the basis of a perceptible or significant change in the position of the receiver.

According to an alternative that is simple to implement, the corridor comprises a rectangle that is oriented at right angles to the navigation coordinate system. Thus, the corridor comprises four threshold values that correspond to distances in the four directions of the compass. The decision regarding whether a message is rejected or the relevance check then comprises two conditions that both have to be satisfied:

latitude of the sender between north and south threshold values?

longitude of the sender between west and east threshold values?

If this rectangle is rotated in accordance with the current characteristic heading, the conditions become more complex and simple multiplications are added.

In another development, the specified method comprises the step of stipulation of the corridor if the vehicle leaves a further corridor that is located in the corridor. This further corridor can thus be used in a simple manner to compute when the superordinate corridor on which the filtering is based is intended to be recomputed.

In a special development of the specified method, the further corridor is dependent on a speed of the vehicle. In this way, it is possible to take account of different traffic situations, such as an unobstructed journey on the freeway and a journey in congestion, which takes account of the fact that fewer data packets can be expected to be received at higher characteristic speeds of the receiver, that is to say of the vehicle, for example. Equally, the decision threshold itself, such as the superordinate corridor, may also be dependent on the speed of the receiver, that is to say of the vehicle, for example.

In another development of the specified method, the position of the sender is stored in a header of the data packet and can therefore immediately be evaluated and taken as a basis for the filtering.

According to a further aspect of the invention, a filter apparatus is set up to perform a method as claimed in one of the preceding claims.

In one development of the specified filter apparatus, the specified apparatus has a memory and a processor. In this case, the specified method is stored in the memory in the form of a computer program, and the processor is provided for carrying out the method when the computer program is loaded into the processor from the memory.

According to a further aspect of the invention, a computer program comprises program code means in order to perform all the steps of one of the specified methods when the computer program is executed on a computer or one of the specified apparatuses.

According to a further aspect of the invention, a computer program product contains a program code that is stored on a computer-readable data storage medium and that, when executed on a data processing device, performs one of the specified methods.

According to a further aspect of the invention, a receiver for a vehicle for receiving a transmission signal that is set up to carry data packets containing at least position data pertaining to vehicles comprises an antenna for receiving the transmission signal,
one of the specified filter apparatuses for filtering at least some of the data packets from the transmission signal,
a presentation apparatus for compiling the position data from the filtered data packets, and
an output interface for outputting the position data in the vehicle.

According to another aspect of the invention, a vehicle comprises one of the specified receivers.

A further aspect of the invention is explained below. The further aspect of the invention relates to a data selection method for reducing the computation effort of a vehicle-to-X communication system.

The prior art already discloses what are known as vehicle-to-X communication systems that are designed for transmitting both traffic-related data and various service data, such as entertainment applications. In this case, the vehicle-to-X communication is based both on the data interchange between vehicles themselves (vehicle-to-vehicle communication) and on the data interchange between vehicles and infrastructure devices (vehicle-to-infrastructure communication). On account of the high demands on the reliability and data integrity of information transmitted by means of vehicle-to-X communication, such information is additionally often provided with a complex security signature or data encryption.

The evaluation of such a security signature and the decoding of such data encryption are associated with a relatively high level of computation effort, however. In order to keep the computation effort and hence the purchase costs for a computation module having sufficient computation power as low as possible, the prior art additionally discloses various preprocessing methods that make a selection for the vehicle-to-X messages that are to be decoded from among all received vehicle-to-X messages. Often, such preprocessing methods are based on the distance between the receiver and the sender of the vehicle-to-X message by deducing a significance of the vehicle-to-X message for the receiver from the distance.

One of the most important pieces of information in a vehicle-to-X message is the absolute position of the originator or the sender of the packet. The originator and the sender are identical in the case of direct transmission without packet forwarding or without forwarding of the vehicle-to-X message via intermediate senders. The term sender usually denotes both the intermediate senders and the actual sender, whereas the actual sender of a vehicle-to-X message is additionally often referred to as the originator. The general term sender is used below. The reason is that the method according to the invention can be used both for an originator and for a sender.

From the position of the sender relative to the receiver, it is possible to compute the distance between sender and receiver. This computation involves a high level of computation effort, however, because it requires coordinate transformation from (ellipsoid) geocoordinates, such as GPS coordinates, to local Cartesian coordinates or terrestrial coordinates. Details pertaining to the computation methods for such conversion are known from "GPS und GNSS: Grundlagen der Ortung und Navigation mit Satelliten" [GPS and GNSS: Principles of satellite location and navigation] by Jean-Marie Zogg, for example.

Without such conversion, the prior art does not allow any distance statement and hence also any corresponding distance-based initial filtering. This thus means that, according to the prior art, each data packet of the received vehicle-to-X messages requires coordinate transformation and always requires the necessary computation power to be kept available.

The object of the present aspect of the invention is therefore to reduce the decoding computation effort of a vehicle-to-X communication system and hence the computation power that needs to be kept available therein.

This is the point at which the aspect of the invention takes effect. Instead of computing a distance from the sender to the receiver in Cartesian coordinates for each data packet or each vehicle-to-X message, the method according to the invention provides for determination of the distance from the sender to the receiver directly in the transmitted geocoordinates. In this case, geocoordinates are, in a general manner, the coordinates used by the different global satellite navigation systems.

In addition, the invention preferably provides for a distance-based selection method for the data packets or vehicle-to-X messages likewise to use the geocoordinates directly, for example for the purpose of comparison with a prescribed distance threshold that, when exceeded, prompts the data packets or vehicle-to-X messages to be rejected as irrelevant. This threshold value check is also preferably performed directly in geocoordinates. Hence, the complex coordinate transformation is saved in the case of those packets or vehicle-to-X messages that are rejected anyway.

One possible and preferred method sequence has the following appearance:
  the distance thresholds are computed in geocoordinates and, in the event of a significant change in the characteristic position, refreshed or adapted to suit the changed characteristic position,
  the position data of received data packets or vehicle-to-X messages are compared directly in geocoordinates, which means that there is no further need for conversion to local Cartesian coordinates,
  the adaptation frequency for the distance threshold in geocoordinates rises as the characteristic speed increases, but at higher characteristic speeds there are normally fewer received packets anyway.

Ideally, the method described is used as early as possible in the processing chain of received data packets or vehicle-to-X messages, that is to say e.g. directly after physical reception, before the remainder of the so-called communication stack is actually handled.

The invention therefore results in the advantage that the use of distance thresholds in geocoordinates allows a distinct reduction in the computation effort required for initial filtering. This in turn results in much lower hardware complexity for the handling of vehicle-to-X messages.

The distance thresholds are computed particularly preferably in rectangular from rectangular geometries or areas around the current characteristic position. These can, furthermore, also be derived in a simple manner from a multiplicity of requirements for different vehicle systems based on vehicle-to-X communication and allow better adaptation thereto than the scalar value of the Euclidean distance.

According to a further preferred embodiment, the relevance area, that is to say the area within the distance thresholds around the receiver, consists of a rectangle oriented at right angles to the navigation coordinate system, so that four distance thresholds are obtained that correspond to distances in the four directions of the compass. The check on the distance thresholds then consists merely of two conditions that both have to be satisfied:
  Is the sender between north and south threshold values?
  Is the sender between west and east threshold values?

If this rectangle is rotated in accordance with the current orientation of the receiver, the computation requirements become more complex and simple multiplications are added. Nevertheless, there continues to be a reduction in the need for computation power in comparison with the position conversion to local Cartesian coordinates, since angle functions are needed only once for setting up the threshold values, rather than for each received data packet or each received vehicle-to-X message.

BRIEF DESCRIPTION OF THE DRAWINGS

The properties, features and advantages of this invention that are described above and also the manner in which they are achieved will become clearer and more distinctly comprehensible in connection with the description of the exemplary embodiments that follows, said exemplary embodiments being explained in more detail in connection with the drawings, in which.

DETAILED DESCRIPTION OF THE PREFERRED EMBODIMENTS

In the figures, like technical elements are provided with like reference symbols and described only once.

Figure 3:
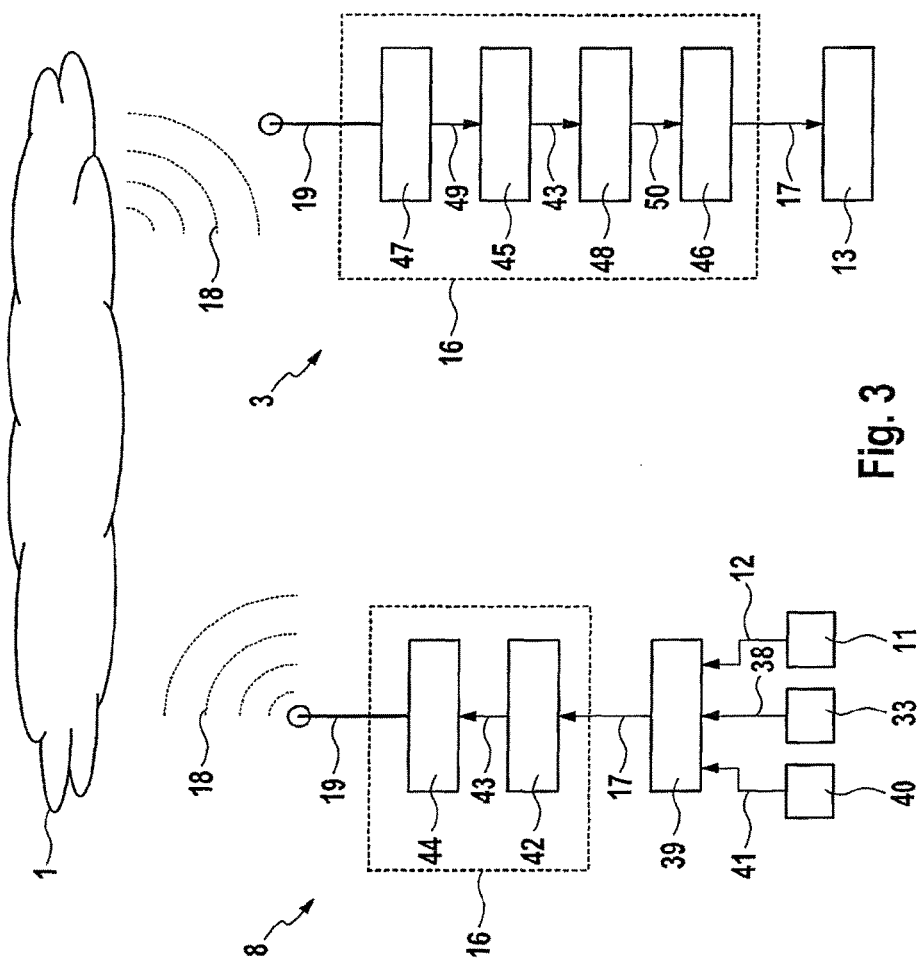
FIG. 3 shows a basic illustration of a vehicle ad hoc network for the vehicle from FIGS. 1 and 2.

The invention relates to a network protocol for a vehicle ad hoc network shown in FIG. 3, which is called car2X network 1 below for the sake of simplicity. To provide a better understanding of the technical background to this car2X network 1, a nonrestrictive exemplary embodiment will first of all be provided for this car2X network 1 before discussing technical details pertaining thereto in more detail.

Figure 1:
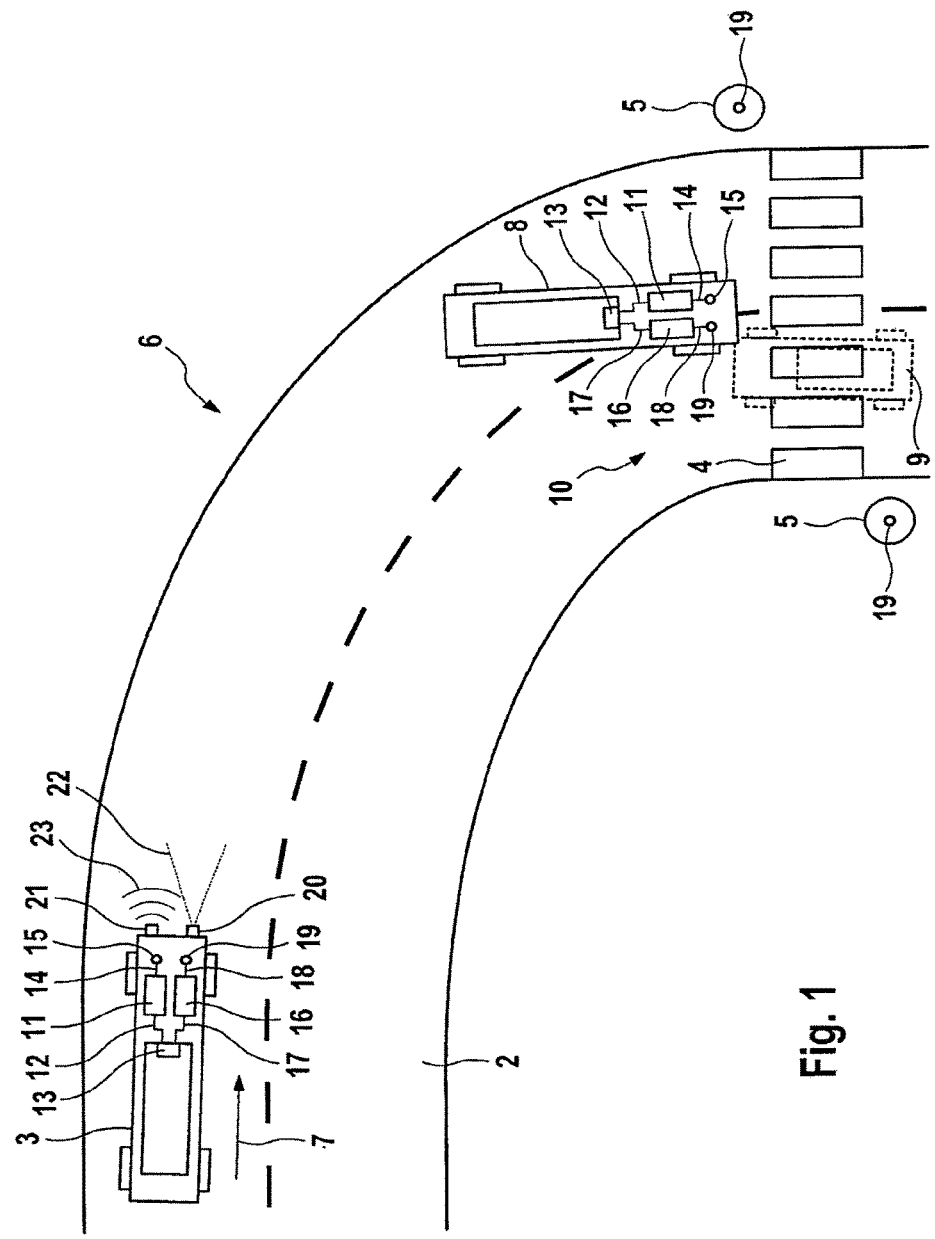
FIG. 1 shows a basic illustration of a vehicle travelling on a road.

Therefore, reference is made to FIG. 1, which shows a basic illustration of a vehicle 3 travelling on a road 2.

In the present embodiment, the road 2 is meant to have a pedestrian crossing 4 at which a set of traffic lights 5 is used to regulate whether the vehicle 4 on the road 2 is permitted to cross the pedestrian crossing 4 or a pedestrian—not shown in more detail—on the pedestrian crossing 4 is permitted to cross the road 2. Between the pedestrian crossing 4 and the set of traffic lights 5, there is, for the purposes of the present embodiment, an obstacle in the form of a curve 6 that conceals the pedestrian crossing 4 from the driver of the vehicle 3 and from an ambient sensor system—which is yet to be described—of the vehicle 3.

In a direction of travel 7 ahead of the vehicle 3, FIG. 1 shows a further vehicle 8 that has been involved in a road accident 10 with a vehicle 9—shown in dots—on the pedestrian crossing 4 and is blocking the lane in the direction of travel 7 of the vehicle 3.

The pedestrian crossing 4 and the road accident 10 are hazard situations on the road 2. If the driver of the vehicle 3 overlooks the pedestrian crossing 4 and therefore illegally fails to stop before it, he could hit a pedestrian who is crossing the pedestrian crossing 4 and who, in crossing the pedestrian crossing 4, relies on the driver of the vehicle 3 behaving in accordance with the rules. In both hazard situations, the driver of the vehicle 3 must stop the vehicle 3 in order to avoid a collision with the hazard object in the hazard situation, that is to say the pedestrian and/or the further vehicle 8. To this end, the car2X network 1 can be used, which will be discussed in more detail at a later juncture.

In the present embodiment, the vehicle 3 has a receiver 11 for a global satellite navigation system, called a GNSS receiver 11 below, which the vehicle 3 can use in a manner known per se to determine position data in the form of its absolute geographical position 12 and to use said position data for the purposes of a navigation system 13, for example, in order to display them on a geographical map, which is not shown further. Corresponding signals 14 from the global satellite navigation system, called GNSS signals 14 below, can be received via an appropriate GNSS antenna 15, for example, and forwarded to the GNSS receiver 11 in a manner known per se.

In the present embodiment, the vehicle additionally has a transceiver 16 that the vehicle 3 can use to be involved as a node in the car2X network 1 and to interchange messages, called car2X messages 17 below, with other nodes, such as the further vehicle 8 and/or the set of traffic lights 5. In order to distinguish it from the GNSS receiver 11, this transceiver 16 will be called car2X transceiver 16 below.

In the car2X messages 17 interchanged via the car2X network 1, the individual nodes 3, 5, 8 can interchange data describing various information with one another, which data can be used to increase road safety on the road 2, for example. An example of the information that can be interchanged with the data in the car2X messages 17 would be the the absolute geographical position 12, determined using the GNSS receiver 11, of the respective node 3, 5, 8 of the car2X network 1. Such data can also be called position data. If the node 3, 5, 8 of the car2X network 1 that receives the geographical position 12 is a vehicle, such as the vehicle 3 that is not involved in the road accident 10 and the vehicle 8 that is involved in the road accident 10, then the geographical position 12 received via the car2X network 1 can be used to represent the traffic movement, for example, on the navigation system 13 of the receiving vehicle 3, 8, for example. If, besides the absolute geographical position 12, the road accident 10 is also described as information with the data in the car2X message 17, then determined traffic situations, such as the road accident 10, can be represented on the navigation system 13 more specifically. Further possible information that can be interchanged with the car2X messages 17 will be discussed in more detail later for the purposes of FIG. 2.

Figure 2:
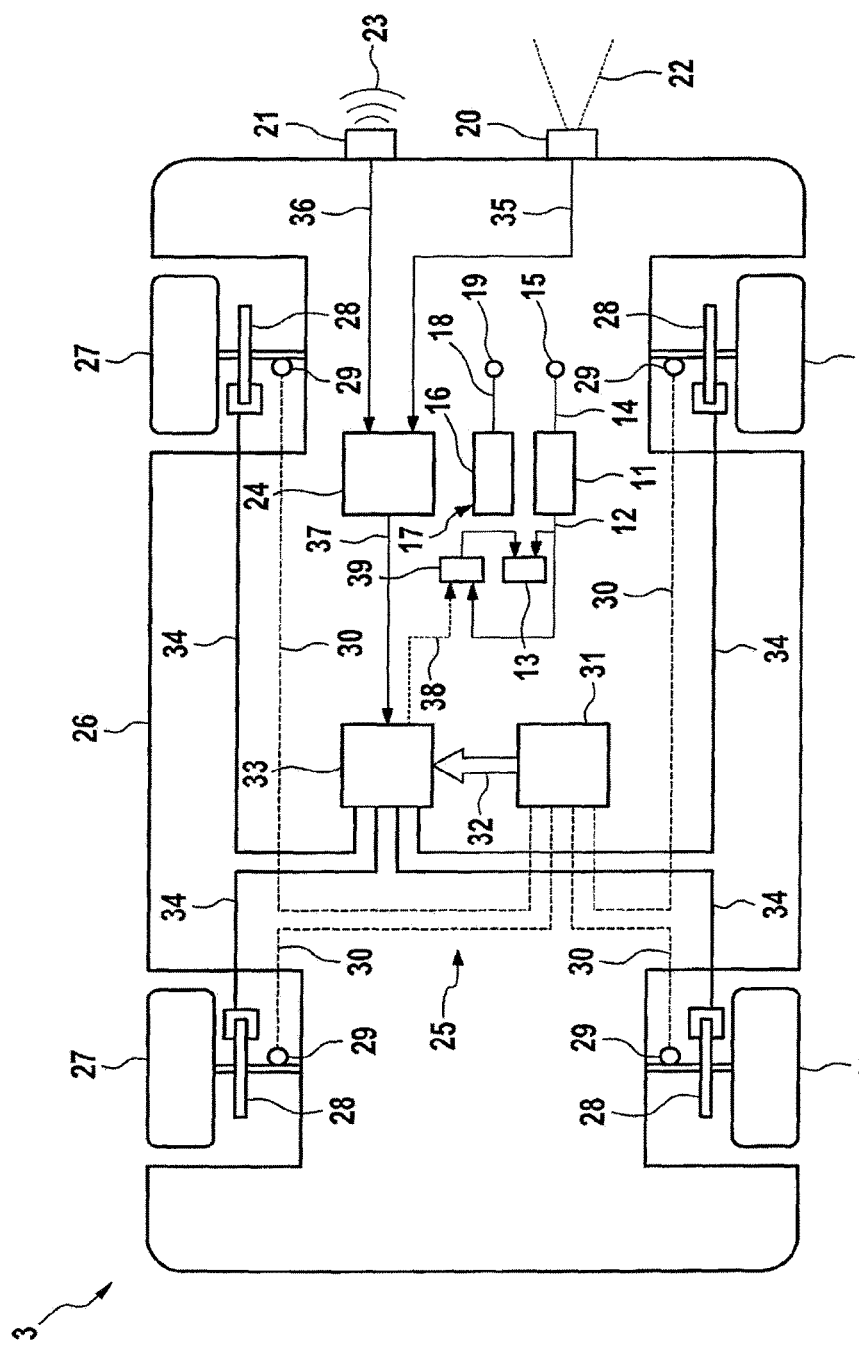
FIG. 2 shows a basic illustration of the vehicle from FIG. 1.

In order to interchange the car2X messages 17, the car2X transceiver 16 either modulates a car2X message 17 onto a transmission signal, called car2X signal 18 below, and sends it via an antenna, called car2X antenna 19 below, to the other nodes 3, 5, 8 in the car2X network 1, or it uses the car2X antenna 19 to receive a car2X signal 18 and filters the relevant car2X message 17 therefrom. This will be discussed in more detail at a later juncture for the purposes of FIG. 3. In this case, FIG. 1 shows that the car2X transceiver 16 outputs a car2X message 17 to the navigation system 13 on the assumption that said message contains, in the manner described above, information that can be represented on said navigation system. This is not intended to be understood as a restriction, however. In particular, it is expediently also possible for the GNSS receiver 11 to be connected to the car2X transceiver 16 directly or, as shown in FIG. 2, indirectly in order to send its own absolute geographical position 12 in the car2X network 1.

The structure of the car2X message 17 and of the car2X signal 18 and hence the design of the car2X network can be defined in a communication protocol. There are already such communication protocols on a country-specific basis, inter alia for the purposes of ETSI TC ITS at ETSI in Europe and for the purposes of IEEE 1609 at IEEE and also at SAE in the United States of America. Further information in this regard can be found in the cited specifications.

The vehicle 3 can optionally also have the aforementioned ambient sensor system in the form of a camera 20 and a radar sensor 21. The camera 20 can be used by the vehicle 3 to record an image of a view that is ahead of the vehicle 3, when considered in the direction of travel 7 of the vehicle 3, within an image angle 22. In addition, the vehicle 3 can use the radar sensor 21 and appropriate radar beams 23 to identify objects, when considered in the direction of travel 7 of the vehicle 3, and to determine the distance from the vehicle 3 in a manner known per se.

In order to substantiate the information that can be transmitted with a car2X message 17, the design of the vehicle 3 and of the further vehicle 5 will first of all be discussed below on the basis of the vehicle 3 by way of example. The vehicle 3 has various safety components, of which FIG. 2 shows an electronic braking assistant 24, called EBA 24, and a driving dynamics control system 25, which is known per se. While DE 10 2004 030 994 AI provides details pertaining to the EBA 24, DE 10 2011 080 789 AI provides details pertaining to the driving dynamics control system 25.

The vehicle 3 comprises a chassis 26 and four wheels 27. Each wheel 27 can be slowed down in comparison with the chassis 26 by means of a brake 28, mounted at a fixed location on the chassis 26, in order to slow down a movement by the vehicle 3 on the road 2.

In this case, in a manner that is known to a person skilled in the art, it may occur that the wheels 27 of the vehicle 3 lose their traction and the vehicle 3 even moves away from a trajectory, for example prescribed by means of a steering wheel, which is not shown further, as a result of understeer or oversteer. This is avoided by the driving dynamics control system 25.

In the present embodiment, the vehicle 4 has speed sensors 29 on the wheels 27 for this purpose, which sense a speed 30 of the wheels 27.

On the basis of the sensed speeds 30, a controller 31 can determine, in a manner that is known to a person skilled in the art, whether the vehicle 3 slips on the carriageway or even deviates from the aforementioned prescribed trajectory, and can react thereto accordingly with a control output signal 32 that is known per se. The controller output signal 32 can then be used by an actuating device 33 in order to use actuating signals 34 to actuate actuating elements, such as the brakes 28, which react to the slipping and the deviation from the prescribed trajectory in a manner that is known per se.

The EBA 24 can evaluate image data 35, captured using the camera 20, and distance data 36, captured using the radar sensor 21, pertaining to objects such as vehicles in the direction of travel 7 ahead of the vehicle 3 and, on the basis thereof, can detect a hazard situation. This hazard situation could arise, by way of example, when an object ahead of the vehicle 3 approaches the latter at an excessive speed. In such a case, the EBA 24 could use an emergency braking signal 37 to instruct the actuating device 33 to use the actuating signals 34 to carry out emergency braking with the brakes 28.

Each time the EBA 24 or the driving dynamics control system 25 uses the actuating device 33 to take action in the vehicle 4, the actuating device 33 can output a report signal 38, for example, which is shown in dots in FIG. 2. Expediently, the report signal 38 should substantiate whether the action was required by the EBA 24 or the driving dynamics control system 25. Such a report signal 38 can be produced by any entity in the vehicle 3, that is to say even by the controller 31 of the driving dynamics control system 25, for example. A message generation device 39 could then take the report signal 38, the absolute geographical position 12 and a timestamp 41, which is shown in FIG. 3 and output from a timer 40, as a basis for generating a car2X message 17 that can be used to report the action of the EBA 24 and/or of the driving dynamics control system 25 to the other nodes 5, 8 as information via the car2X network 1. The car2X message 17 generated in this manner could then be sent in the car2X network 1 via the car2X antenna 19.

In the example of FIG. 1, it was explained that the information about the absolute geographical position 12 of the individual nodes 3, 5, 8 and/or about events such as the road accident 10 and/or such as an action by the EBA 24 and/or the driving dynamics control system 25 that is interchanged in the car2X messages 17 could be represented on the navigation system 13 for the purpose of orienting the driver. Alternatively or additionally, the information interchanged in the car2X messages 17 can also be taken as a basis for actively generating actuating signals 34, for example using the actuating device 33, however. If, by way of example, the action by the EBA 24 is transmitted as information in a car2X message 17, then it would be possible, by way of example, to take the reception of this car2X message 17 as a basis for automatically triggering the EBA 24 in the receiving vehicle 3, 8.

The transmission of a car2X message 17 via the car2X network 1 will be explained below with reference to FIG. 3, said car2X network being indicated by a cloud in FIG. 3 for the sake of clarity. The content of the car2X message 17 is intended to be assumed to be, by way of example, an action—reported by the actuating device 33 with the report signal 38—by the EBA 24 in the accident vehicle 8 involved in the road accident 10.

As already explained, the message generation device 39 takes the report signal 38, the absolute geographical position 12 and the timestamp 41 as a basis for generating the car2X message 17 according to the aforementioned communication protocol. In this case, the message generation device 39 may also be part of the car2X transceiver 16, in principle.

From the car2X message 17, data packets 43 are generated in a data packet generation device 42 in the car2X transceiver 16 of the accident vehicle 8. The generation of data packets 43 means that car2X messages 17 from various applications in the accident vehicle 8 can be combined to form a single data stream in order to produce the car2X signal 18. The data packet generation device 42 therefore corresponds to a network and transport layer, the task of which is known to be to route the network data from various applications. The design of the data packet generation device 42 is dependent on the aforementioned specification of the communication protocol for the car2X network 1.

The generated data packets 43 are modulated onto the car2X signal 18 in a modulation device 44 and wirelessly sent in the car2X network 1. The modulation device 44 therefore corresponds to an interface layer, the task of which is to physically connect the accident vehicle 8 to the car2X network 1. The design of the modulation device 44 is also dependent on the aforementioned specification of the communication protocol for the car2X network 1.

In the vehicle 3 that is not involved in the road accident 10, the car2X signal 18 sent by the accident vehicle 8 can then be received via the car2X antenna 19.

In order to extract the car2X message 17 from the car2X signal 18, the car2X transceiver 16 of the vehicle 3 has a demodulation device 45 that reverses the sender-end modulation of the data packets 43 in a manner that is known per se. Accordingly, a message extraction device 46 can extract the car2X messages 17 from the data packets 43 and make them available to the applications in the vehicle 3, such as the navigation system 13 or even the actuating device 33. Ultimately, the demodulation device 45 and the message extraction device 46 are the reception-end counterparts in accordance with the aforementioned network and transport layer and the interface layer and are likewise dependent on the aforementioned specification of the communication protocol for the car2X network 1.

For details of the individual network layers, reference is therefore made to the relevant specifications.

Particularly in high-load situations when there are a multiplicity of nodes 3, 5, 8 in the car2X network 1 on the road 2, it is necessary for correspondingly high levels of computation resources to be kept free in the respective nodes 3, 5, 8 for the purpose of processing all car2X messages 17 sent in the car2X network 1, in order to guarantee the processing of all car2X messages 17 at the receiver end within particular time limits. The provision of these high levels of computation resources is associated with a correspondingly high outlay in terms of cost, which is intended to be reduced for the purposes of the present embodiment by the introduction of initial filters 47, 48.

The concept behind the initial filters 47, 48 is for potentially irrelevant car2X messages 17 to be eliminated as early as possible in order to avoid their needing to be processed unnecessarily by an element in the reception chain because, as it is, they contain information that is irrelevant to the receiving node. One option would be to place a first initial filter 47 from the two initial filters 47, 48 between the car2X antenna 19 and the demodulation device 45 and to perform the initial filtering on the basis of a signal strength of the car2X signal 18. The concept behind the first initial filter 47 is that nodes 5, 8 that are further away from the receiving node, that is to say from the vehicle 3 that is not involved in the accident 10, are less relevant because, at least from the point of view of road safety, they cannot become a danger to the vehicle 3 that is not involved in the accident 10 in the immediate proximity of time.

The data packets 43 can then be demodulated from the car2X signal 49 filtered in this manner.

To extend the aforementioned approach of filtering out the car2X messages 17 from transmitting nodes that are further away from the receiving node without unpacking the relevant car2X messages 17 themselves, it is proposed, for the purposes of the present embodiment, that the second initial filter 47 from the two initial filters 47, 48 be used to filter the data packets 43 on the basis of the position data already contained in the data packets 43, that is to say the absolute geographical position 12. This is possible because the absolute geographical position 12 is normally carried at a predetermined location in the data packet 43, for example in the header of the data packet 43. Only from the data packets 50 filtered in this manner is it then possible for the message extraction device 46 to be used to extract the car2X messages 17, the computation complexity of the message extraction device 46 having perceptibly decreased on account of the car2X messages 17 disappearing in advance as a result of the initial filters 47, 48.

For the purpose of implementing the second initial filter 46, it is proposed that a decision threshold for a distance 51 between a receiving node and a transmitting node be defined, upward of which a data packet 43 is intended to be filtered out and the relevant car2X message 17 ignored. Before the definition of the decision threshold for the aforementioned distance 51 between a receiving node and a transmitting node can be discussed in more detail, it will first of all be clarified what in the car2X network 1 is a receiving node and what is a transmitting node.

Figure 4:
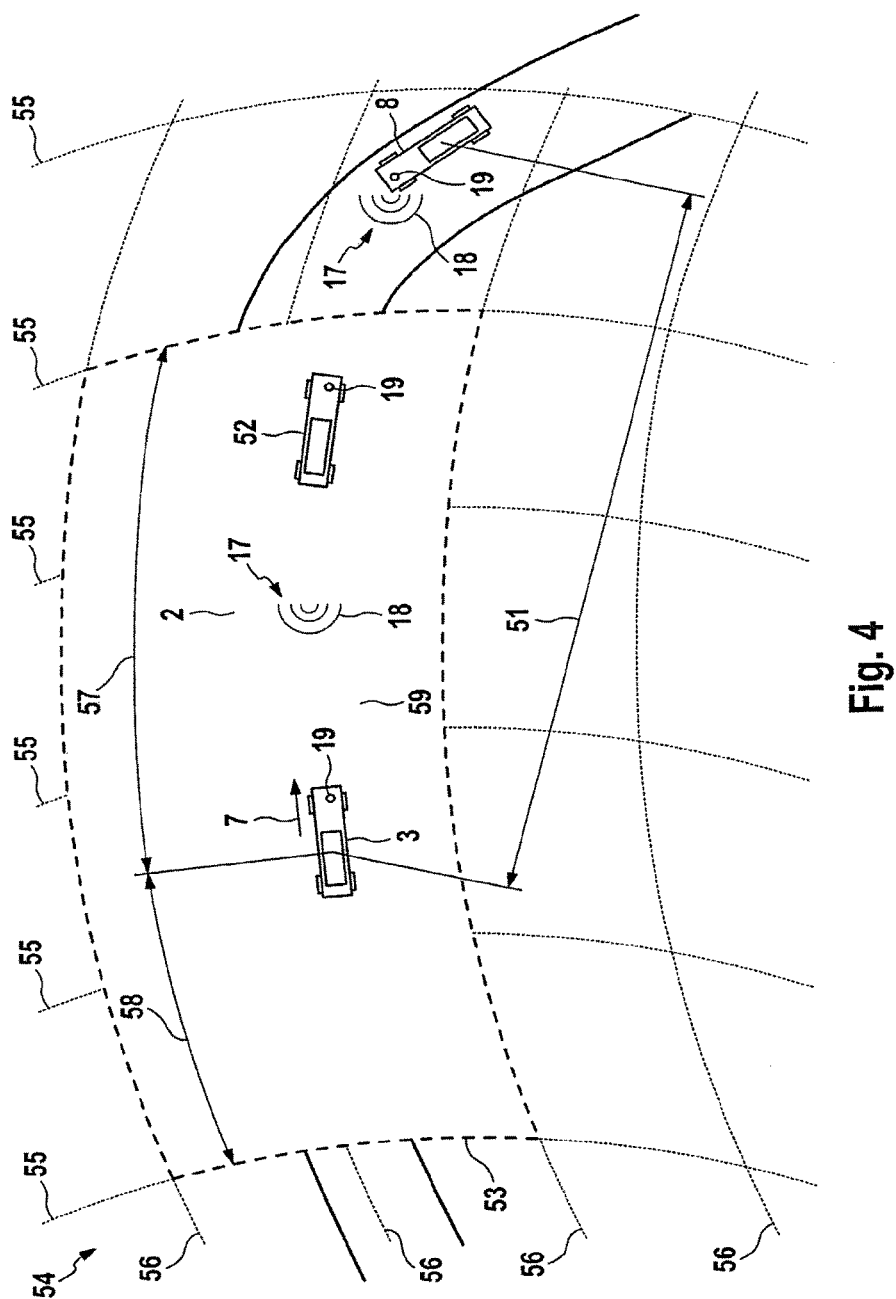
FIG. 4 shows a basic illustration of a coordinate system for describing a position of the vehicle from FIG. 1 on the road, FIG. 5 schematically shows the data structure of a vehicle-to-X message.

In this regard, reference is made to FIG. 4.

A receiving node in the car2X network 1 will always be a node 3, 5, 8 that receives a car2X message 17. For the purposes of FIG. 4, this is the vehicle 3 that is not involved in the accident 10, for example. Therefore, the vehicle 3 that is not involved in the accident represents the receiving node below.

A transmitting node in the car2X network 1 will always be a node 3, 5, 8 that produces and sends a car2X message 17 and is therefore the origin thereof. A transmitting node can therefore also be referred to as the originator of a car2X message 17. For the purposes of FIG. 4, as a transmitting node, the vehicle 8 that is involved in the accident 10 will represent the transmitting node.

So that car2X messages 17 in the car2X network 1 can also be transmitted over distances 51 that exceed the transmission range of a car2X signal 17, it is possible for nodes 3, 5, 8 in the car2X network 1 that are located between the transmitting node 8 and the receiving node 3 and that receive the car2X signal 18 having the car2X message 17, for example from the transmitting node 8, to forward the car2X message 17 to the receiving node 3 using a car2X signal 18 of their own. Such forwarding nodes or intermediate nodes may be any subscribers in the car2X network 1. For this purpose, FIG. 4 indicates a singular vehicle having the reference symbol 52.

The aforementioned decision threshold is in this case intended to be defined for distances 51 between the transmitting node 8, as the origin of a car2X message 17 rather than as the origin of a car2X signal 18, and the receiving node 3.

For the purposes of the present embodiment, the decision threshold is defined in the form of a corridor 53 that is positioned around the receiving node 3. A car2X message 18 is intended to be filtered out by the second initial filter 46 if the geographical position 12 of the transmitting node 8 does not fall within the corridor 53 when the car2X message 18 is sent.

The form in which the geographical position 12 of a node 3, 5, 8, 52 in the car2X network 1 is described is dependent on the aforementioned specification. Normally, the geographical position 12 is described in a Cartesian coordinate system, because the geographical position 12 is simplest to process by computer in said coordinate system. This coordinate system defined by the specification could also be used to define the decision threshold and hence the corridor 53.

However, on principle, the GNSS receiver 11 determines the geographical position 12 in an ellipsoid coordinate system 54 having degrees of longitude 55 and degrees of latitude 56. Provided that the decision threshold and hence the corridor 53 have been defined in the aforementioned manner in the coordinate system defined by the specification, the geographical position 12 ought first to be transformed to the relevant coordinate system in a car2X message 17 in the second initial filter 46. This has the advantage that the transformed geographical position 12 can then immediately continue to be used and that the decision threshold and hence the corridor 53 can be determined directly in the coordinate system that is simpler to handle by computer and that is determined by the specification.

This is where the present embodiment takes effect with the proposal to determine the decision threshold and hence the corridor 53, as shown in FIG. 4, directly in the ellipsoid coordinate system 54. As far as computation complexity is concerned, this is counter-productive at first glance, because not only is the determination of the decision threshold and hence of the corridor 53 in the ellipsoid coordinate system 54 computation-intensive on account of the trigonometric correlations, it is additionally necessary for the geographical position 12 to be converted to the coordinate system defined by the specification after passing through the second initial filter 46.

Taking account of a high-load situation in the car2X network 1, in which a multiplicity of car2X messages 26 can be expected from a multiplicity of different nodes 3, 5, 8, 52, the aforementioned notion becomes clearly apparent. If the car2X messages 17 are filtered directly in the ellipsoid coordinate system 54 prescribed by the GNSS receiver 11, then the geographical positions of all data packets 43 and hence of all car2X messages 17 that do not pass through the second initial filter 46 also do not need to be transformed to the coordinate system defined by the specification. In a high-load situation, in which the complexity for converting the geographical positions 12 in the individual received data packets 43 would exceed the complexity for determining the decision threshold and hence the corridor 53 directly in the ellipsoid coordinate system 54 by a multiple, computation resources can thus be perceptibly saved.

In order to save the computation resources further, the decision threshold and hence the corridor 82 should be defined such that the corridor 53 needs to be recomputed as little as possible. To this end, the corridor 53 is set up with a first corridor section 57 in front of the vehicle 3 and a second corridor section 58 behind the vehicle 3, as seen in the direction of travel 7 of the vehicle 3 acting as receiving node. In this case, the first corridor section 57 should be longer than the second corridor section 58 in order to give the traffic in the direction of travel 7 in front of the vehicle 3 a correspondingly higher relevance.

The two corridor sections 57, 58 are stipulated as constant for a period that should be chosen such that firstly the corridor 53 and hence the decision threshold do not have to be updated all too frequently, but secondly not all too many data packets 43 pass through the second initial filter 46.

As a basis for updating the corridor 53, a further, inner corridor 59 can be defined in the corridor 53, for example. So long as the receiving node and hence the vehicle 3 stay in the inner corridor 59, the outer corridor 53 can remain unchanged. If the vehicle 3 leaves the inner corridor 59, then the outer corridor 53 and at the same time also the inner corridor 59 can be updated.

In this case, the two corridor sections 57, 58 of the outer corridor 53 can be stipulated on the basis of a marginal region of the inner corridor 59, for example. The size of the inner corridor 59 and/or the size of the outer corridor 53 may be dependent on the speed of the receiving node and hence of the vehicle 3 in this case, for example in order to take account of unobstructed journeys on the freeway and journeys on congested roads in the second initial filter 46 as appropriate. The reference symbols in FIGS. 5 and 6 below refer to different technical elements than the reference symbols in FIGS. 1 to 4.

Figure 5:
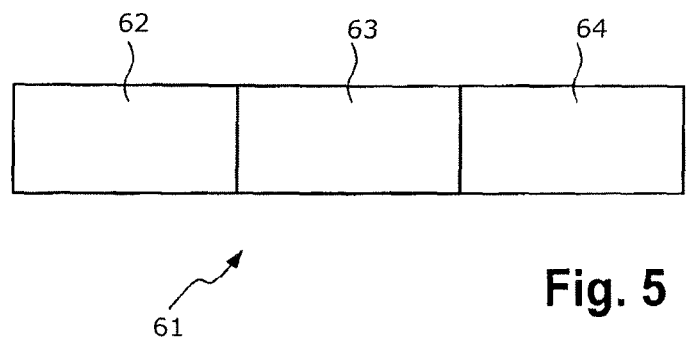

FIG. 5 shows the data structure of vehicle-to-X message 61. Vehicle-to-X message 61 comprises header data component 62, data integrity component 63 and useful data component 64. Header data component 62, data integrity component 63 and useful data component 64 may for their part be divided into further subcomponents, this not being the case in this exemplary embodiment, however. Header data component 62 is uncoded, data integrity component 63 is digitally encrypted and comprises a data integrity certificate, and useful data component 64 is coded in the ASN.1 format. Since header data component 62 furthermore comprises the position data of the sender in geocoordinates, it is possible for the distance from the sender to the receiver to be determined without special computation effort.

Figure 6:
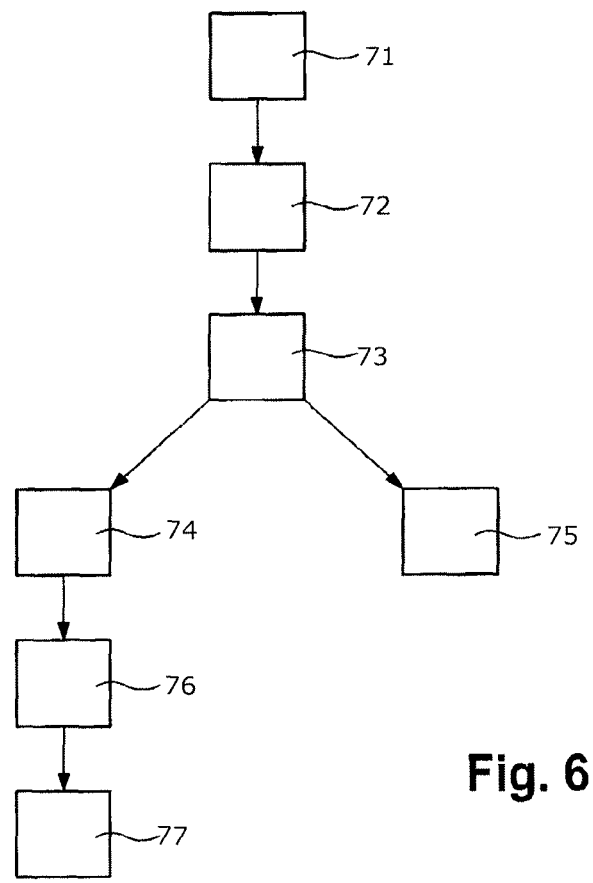
FIG. 6 shows a flowchart that presents the individual sequence steps of a possible embodiment of the method according to an aspect of the invention.

FIG. 6 shows an exemplary sequence for the method according to the invention as a flowchart. In step 71, a vehicle-to-X message is received by means of a communication unit. In step 72 that follows, the header data component of the vehicle-to-X message, and particularly the position data comprised therein for the sender, is/are read and evaluated. In step 73, there then follows a comparison of the position data of the sender with the distance thresholds. Provided that the position data are located within the area framed by the distance thresholds, the vehicle-to-X message or the data packets comprised by the vehicle-to-X message is/are flagged as relevant in step 74. If the position data are located outside the area framed by the distance thresholds, however, then the vehicle-to-X message or the data packets comprised by the vehicle-to-X message is/are flagged as irrelevant in step 75 and rejected. In this case, no further processing of the data packets or of the vehicle-to-X message takes place, therefore. Finally, in step 76, the data packets or vehicle-to-X messages flagged as relevant are decoded, so that they can be processed further and evaluated by the relevant vehicle systems in step 77.

The further aspect of the invention also includes the following principles:

1. A data selection method for reducing the computation effort of a vehicle-to-X communication system, wherein a communication unit is used to receive and send vehicle-to-X messages and wherein the vehicle-to-X messages comprise position data for their sender in geocoordinates, characterized in that a distance from the receiver to the sender in geocoordinates is determined from a characteristic position of a receiver and the position data of the sender.

2. The method according to principle 1, characterized in that the receiver also determines its characteristic position in geocoordinates.

3. The method according to at least one of principles 1 and 2, characterized in that the distance is determined by comparison with a distance threshold, wherein the distance is determined to be above the distance threshold or to be below the distance threshold.

4. The method according to at least one of principles 1 to 3, characterized in that four distance thresholds around the receiver are determined.

5. The method according to at least one of principles 1 to 4, characterized in that the four distance thresholds frame a rectangular area around the receiver.

6. The method according to at least one of principles 1 to 5, characterized in that the receiver is in the center of the rectangular area.

7. The method according to at least one of principles 1 to 6, characterized in that the four distance thresholds are oriented parallel to coordinate axes of the geocoordinate system.

8. The method according to at least one of principles 1 to 7, characterized in that the four distance thresholds are rotated in accordance with an orientation of the receiver compared with the coordinate axes of the geocoordinate system.

9. The method according to at least one of principles 1 to 8, characterized in that the distance thresholds are determined for a particular characteristic position of the receiver and are redetermined if the receiver alters its characteristic position, in particular alters it by more than 50 m.

10. The method according to at least one of principles 1 to 9, characterized in that the four distance thresholds are determined at high speeds of the receiver such that the receiver initially moves to the center of the rectangular area before leaving it again.

11. The method according to at least one of principles 1 to 10, characterized in that the rectangular area comprises an area of 100 m×50 m.

12. The method according to at least one of principles 1 to 11, characterized in that received vehicle-to-X messages that are received from senders outside the distance threshold(s) are flagged as irrelevant.

13. The method according to at least one of principles 1 to 12, characterized in that vehicle-to-X messages flagged as irrelevant are not decoded and not processed.

14. The method according to at least one of principles 1 to 13, characterized in that received vehicle-to-X messages that are received from senders within the distance threshold(s) are flagged as relevant.

15. The method according to at least one of principles 1 to 14, characterized in that vehicle-to-X messages flagged as relevant are decoded and processed.

16. The method according to at least one of principles 1 to 15, characterized in that the vehicle-to-X messages each comprise a multiplicity of data packets.

The invention claimed is:

1. A method for filtering a message transmitted between a sender vehicle and a receiver vehicle in a vehicle ad hoc network that contains at least one position of the sender, the method comprising:

determining, by a global satellite navigation system (GNSS) in the receiver vehicle, a position of the receiver vehicle in a predetermined GNSS coordinate system that describes positions in spherical or ellipsoid geo-coordinates on the earth's surface, the predetermined GNSS coordinate system different than a coordinate system of the vehicle ad hoc network;

determining, by the processor in the receiver vehicle, a decision threshold for a maximum distance between the receiver vehicle and the sender vehicle in the predetermined GNSS coordinate system in which the position of the receiver has been determined; and rejecting, by the processor in the receiver vehicle, the message if a distance between the position of the sender and the position of the receiver in the GNSS coordinate system exceeds the decision threshold in the GNSS coordinate system;

accepting, by the processor in the receiver vehicle, the message if the distance between the position of the sender and the position of the receiver in the GNSS coordinate system does not exceed the decision threshold in the GNSS coordinate system; and converting, by the processor in the receiver vehicle, the position of the receiver vehicle from the GNSS coordinate system to the coordinate system of the vehicle ad hoc network for further processing of the accepted message.

2. The method as claimed in claim 1, wherein the decision threshold comprises a corridor around the position of the receiver, so that the message is rejected if the position of the sender is outside the corridor.

3. The method as claimed in claim 2, wherein the receiver is a vehicle and the corridor is larger in the direction of travel of the vehicle than counter to the direction of travel.

4. The method as claimed in claim 2, further comprising: updating the corridor if the receiver leaves a further corridor that is located in the corridor.

5. The method as claimed in claim 4, wherein the further corridor is dependent on a speed of the receiver.

6. The method as claimed in claim 1, wherein the decision threshold is dependent on a speed of movement of the receiver.

7. The method as claimed in claim 1, wherein the message is at least part of a data packet that stores the position of the sender in a header of the data packet.

8. A filter apparatus for performing a method as claimed in claim 1.

9. A receiver in a receiver vehicle for receiving a transmission signal transmitted from a sender vehicle that is set up to carry messages having position data pertaining to subscribers of a vehicle ad hoc network in data packets, comprising:

an antenna for receiving the transmission signal;
a global satellite navigation system (GNSS) configured to determine a position of the receiver vehicle in a predetermined GNSS coordinate system that describes positions in spherical or ellipsoid geo-coordinates on the earth's surface, the predetermined GNSS coordinate system different than a coordinate system of the vehicle ad hoc network; and
a filter apparatus configured to:
determine a decision threshold for a maximum distance between the receiver vehicle and the sender vehicle in the predetermined GNSS coordinate system in which the position of the receiver has been determined; and
reject the message if a distance between the position of the sender and the position of the receiver in the GNSS coordinate system exceeds the decision threshold in the GNSS coordinate system;
accept the message if the distance between the position of the sender and the position of the receiver in the GNSS coordinate system does not exceed the decision threshold in the GNSS coordinate system; and
convert the position of the receiver vehicle from the GNSS coordinate system to the coordinate system of the vehicle ad hoc network for further processing of the accepted message.

10. The method as claimed in claim 1, wherein the decision threshold comprises a corridor around the position of the receiver, so that the message is rejected if the position of the sender is outside the corridor.

11. The method as claimed in claim 3, further comprising: updating the corridor if the receiver leaves a further corridor that is located in the corridor.

* * * * *